United States Patent [19]

Nagashima

[11] Patent Number: 5,604,853
[45] Date of Patent: Feb. 18, 1997

[54] TEXT EDITOR USING INSERT, UPDATE AND DELETE STRUCTURES FOR UNDO AND REDO OPERATIONS

[75] Inventor: Hironobu Nagashima, Kawasaki, Japan

[73] Assignee: Fujitsu Limited, Kawasaki, Japan

[21] Appl. No.: 884,405

[22] Filed: May 18, 1992

[30] Foreign Application Priority Data

May 18, 1991  [JP]  Japan .................................. 03113578

[51] Int. Cl.⁶ ...................................................... G06F 17/24
[52] U.S. Cl. ............................................................. 395/803
[58] Field of Search ....................... 395/146; 364/419.17

[56] References Cited

U.S. PATENT DOCUMENTS

| | | | |
|---|---|---|---|
| 4,498,145 | 2/1985 | Baker et al. | 395/600 |
| 4,723,210 | 2/1988 | Barker et al. | 395/147 |
| 4,723,211 | 2/1988 | Barker et al. | 395/147 |
| 4,739,477 | 4/1988 | Barker et al. | 395/600 |
| 4,912,637 | 3/1990 | Sheedy et al. | 395/600 |
| 5,070,478 | 12/1991 | Abbott | 364/419.17 |
| 5,132,900 | 7/1992 | Gilchrist et al. | 364/419.19 |
| 5,133,066 | 7/1992 | Hansen et al. | 395/600 |
| 5,170,480 | 12/1992 | Mohan et al. | 395/600 |
| 5,173,854 | 12/1992 | Kaufman et al. | 364/419.17 |
| 5,189,731 | 2/1993 | Sakamoto et al. | 395/146 |
| 5,216,604 | 6/1993 | Sakato et al. | 395/146 X |
| 5,278,979 | 1/1994 | Foster et al. | 395/600 |
| 5,280,574 | 1/1994 | Mizuta et al. | 395/146 |
| 5,317,731 | 5/1994 | Dias et al. | 395/600 |
| 5,323,313 | 6/1994 | Davis et al. | 364/419.17 |

FOREIGN PATENT DOCUMENTS 63-762  1/1988  Japan .............................. G06F 15/20

OTHER PUBLICATIONS

Mirecki, Brief Programming Editor Boosts Interface Features, PC Week Apr. 13, 1991 p. 57.
Borland, Turbo Editor Toolbox Owner's Handbook, 1985, pp. 17–21 1985.
Borland, Quattro Users Guide, 1987, pp. 385 to 400.

*Primary Examiner*—Heather R. Herndon
*Assistant Examiner*—Anton W. Fetting
*Attorney, Agent, or Firm*—Staas & Halsey

[57] ABSTRACT

A text managing system performs an editing operation of a text using a text editing program in a computer system. The system includes a text operation unit which receives insertion/update/deletion information of the text input by an operator and displays the result of the editing for the above information on a screen. An UNDO/REDO control unit restores the text to be displayed on the screen for the previous states as to the result of the editing and reexecuting the text restored based on the above steps. An UNDO management table stores UNDO levels indicating the number of the UNDO operation. An UNDO management block manages the text edited in the above steps by pointing from the UNDO management table during the editing operation. An UNDO text block holds an insertion text into be inserted to the text, an update text to be updated from the text, and a deletion text to be deleted from the text during the editing operation. A text processing unit for manages the text already edited in the editing operation. A text management block manages the insertion text, the update text, and the deletion text. A history management unit forms the difference text a before/after editing operation based on the insertion text, the update text and the deletion text pointed to by the text management block.

3 Claims, 13 Drawing Sheets

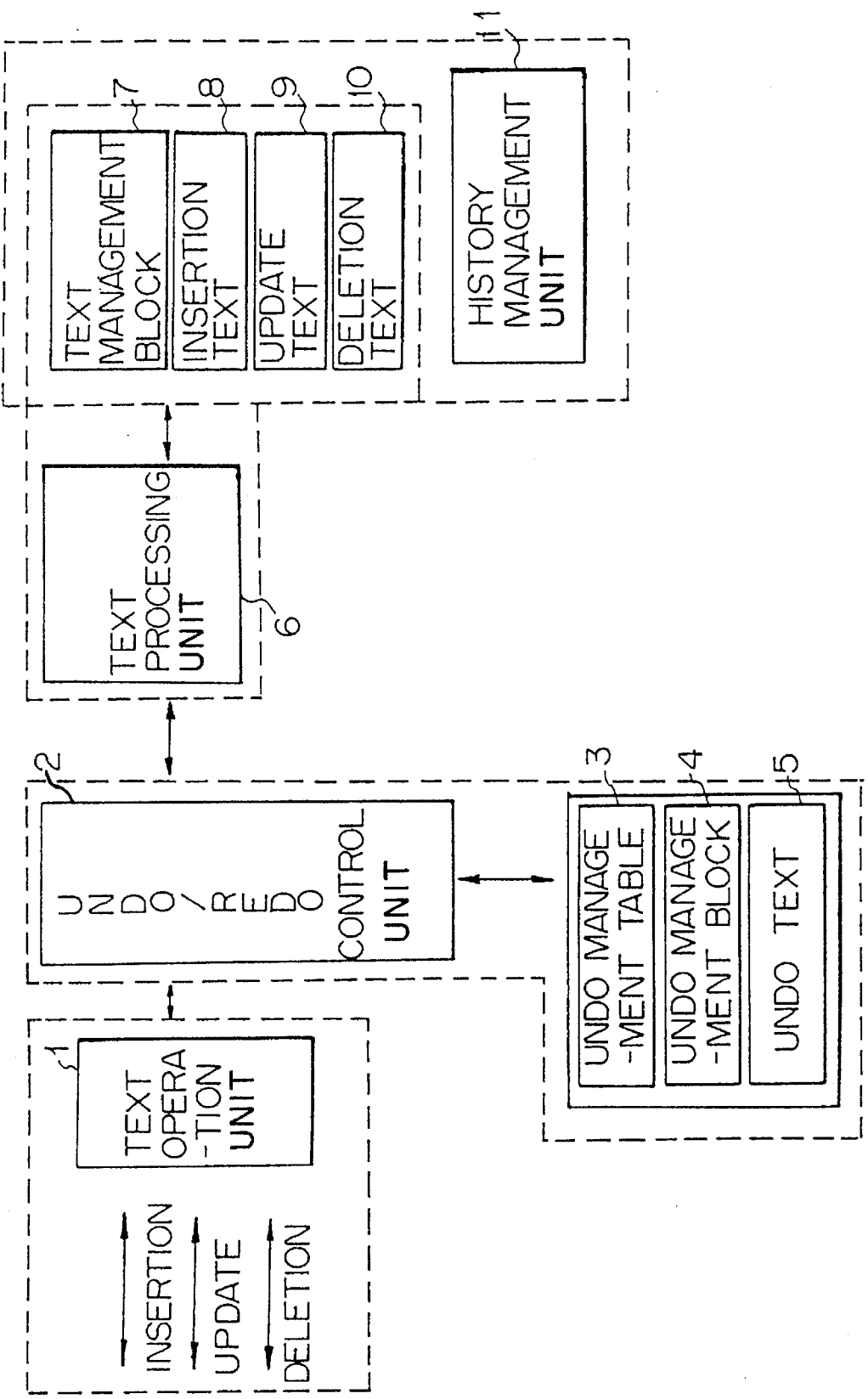

INSERTION TEXT

DELETION TEXT

TEXT EDITOR USING INSERT, UPDATE AND DELETE STRUCTURES FOR UNDO AND REDO OPERATIONS

BACKGROUND OF THE INVENTION

1. Field of the Invention

The present invention relates to a text managing system, more particularly, it relates to a system for effectively performing a restoring/reexecuting operation of a text in an editing operation of the text by using a text editing program (hereinafter referred to as a text editor) in a computer system.

2. Description of the Related Art

A text editor is a type of computer program used for a restoring/reexecuting operation of the text when inserting, updating and deleting a desired portion of the text in the editing operation thereof in accordance with an operator's request. In general, a plurality of texts are stored in a file system provided in the computer system so that such an editing operation is performed by displaying the text on a screen. In this case, it is desired to effectively perform the editing operation for the text.

SUMMARY OF THE INVENTION

An object of the present invention is to provide a text managing system enabling an effective editing operation for the text.

In accordance with the present invention, there is provided a text managing system in an editing operation of the text by using a text editing program in a computer system, the system including:

a text operation unit for receiving information of insertion, updating and deletion of the text instructed by an operator, and for displaying the result of the editing for the above information on a screen;

a restoration/reexecuting (UNDO/REDO) control unit operatively connected to the text operation unit for restoring the text to be displayed on the screen for the previous states (for example, the state of the last time, and the state before the last time) as to the result of the editing, and for reexecuting the text restored by the above steps;

an UNDO management table operatively connected to the UNDO/REDO control unit for storing UNDO levels indicating the number of the UNDO operation;

an UNDO management block operatively connected to the UNDO management table for managing the text edited in the above steps by pointing from the UNDO management table in the editing operation;

an UNDO text block operatively connected to the UNDO management block for holding an insertion text to be inserted into the text, an update text to be updated from the text, and a deletion text to be deleted from the text in the editing operation;

a text processing unit operatively connected to the UNDO/REDO control unit for managing the text already edited in the editing operation;

a text management block operatively connected to the text processing unit for managing the insertion text, the update text, and the deletion text; and a history management unit for forming the difference text before/after editing operations based on the insertion text, the update text and the deletion text pointed by the text management block.

In the preferred embodiments, the insertion text has an area for storing the identification of an insertion, an area for storing an address of a text management block, and an area for storing the contents of the text and an insertion flag. The update text and the deletion text have the same structure as the above insertion text.

Further, in accordance with another aspect of the present invention, there is provided a method for managing a text in an editing operation of the text by using a text editing program in a computer system, including:

providing a text management block for managing a plurality of texts to be edited for every management block;

generating an insertion text, an update text, or a deletion text in accordance with an editing operation;

setting points and insertion/update/deletion flags in the corresponding insertion text, update text, and deletion text by using the text management block; and managing the insertion/update/deletion operation for the text in the editing operation.

BRIEF DESCRIPTION OF THE DRAWINGS

In the drawings;

FIG. 6 is a schematic block diagram of a text managing system according to an embodiment of the present invention;

DESCRIPTION OF THE PREFERRED EMBODIMENTS

Before describing the preferred embodiments, an explanation will be given of a conventional art.

Figure 1:
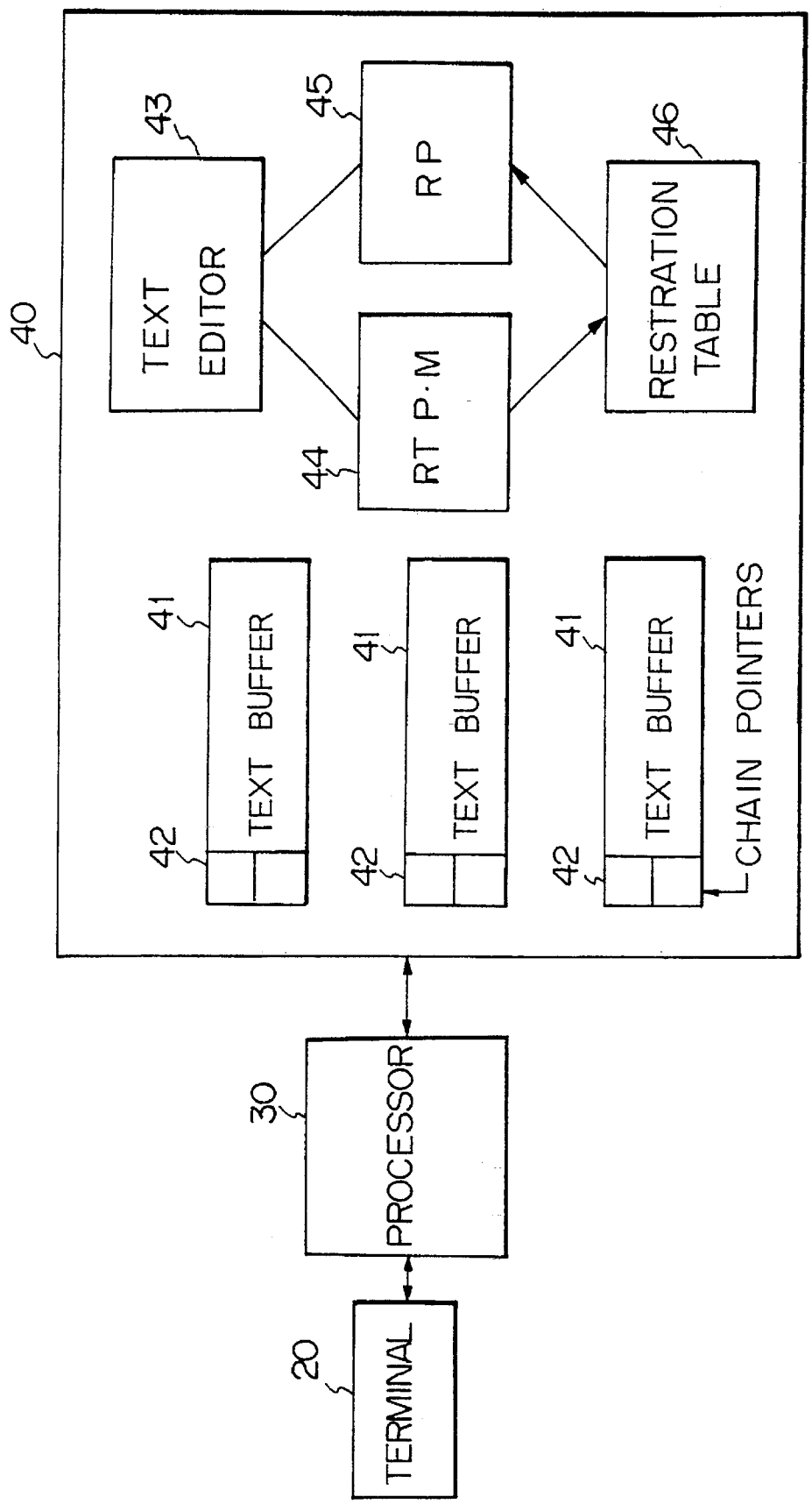
FIG. 1 is a schematic block diagram of a prior art system for restoring/reexecuting a text.

FIG. 1 is a schematic block diagram of a computer system for restoring/reexecuting a text. This conventional art is disclosed in the Japanese Unexamined Patent Publication (KOKAI) No. 63-762. A computer system has terminal equipment 20, a processor 30, and a storage unit 40. Further, the storage unit 40 has a text editor 43, restoration table preparation means (RTPM) 44, a restoration processor (RP) 45, a restoration table 46, and a plurality of text buffers 41 each having two chain pointers 42.

In this structure, when the operator inputs the command "insertion", "deletion", "copy" and the like from the terminal equipment 20 (for example, key board) to the storage unit 40 through the processor 30, the text editor 43 generates the restoration table 46 and performs the editing operation for the above commands. Further, the restoration table generation means 44 receives the pointers from the text editor 43, and stores them in the restoration table 46. In this case, each of the chain pointers 42 has a forward direction area (lower portion) and a reverse area (upper portion) to decide the direction of the pointer, and is inserted just before the pointer and just after the pointer of the text buffer 41 (i.e., texts) to be inserted or deleted. That is, the forward pointer to be inserted just before the text buffer and the reverse pointer to be inserted just after the text buffer to be inserted or deleted are stored in the restoration table 46.

Figure 2:
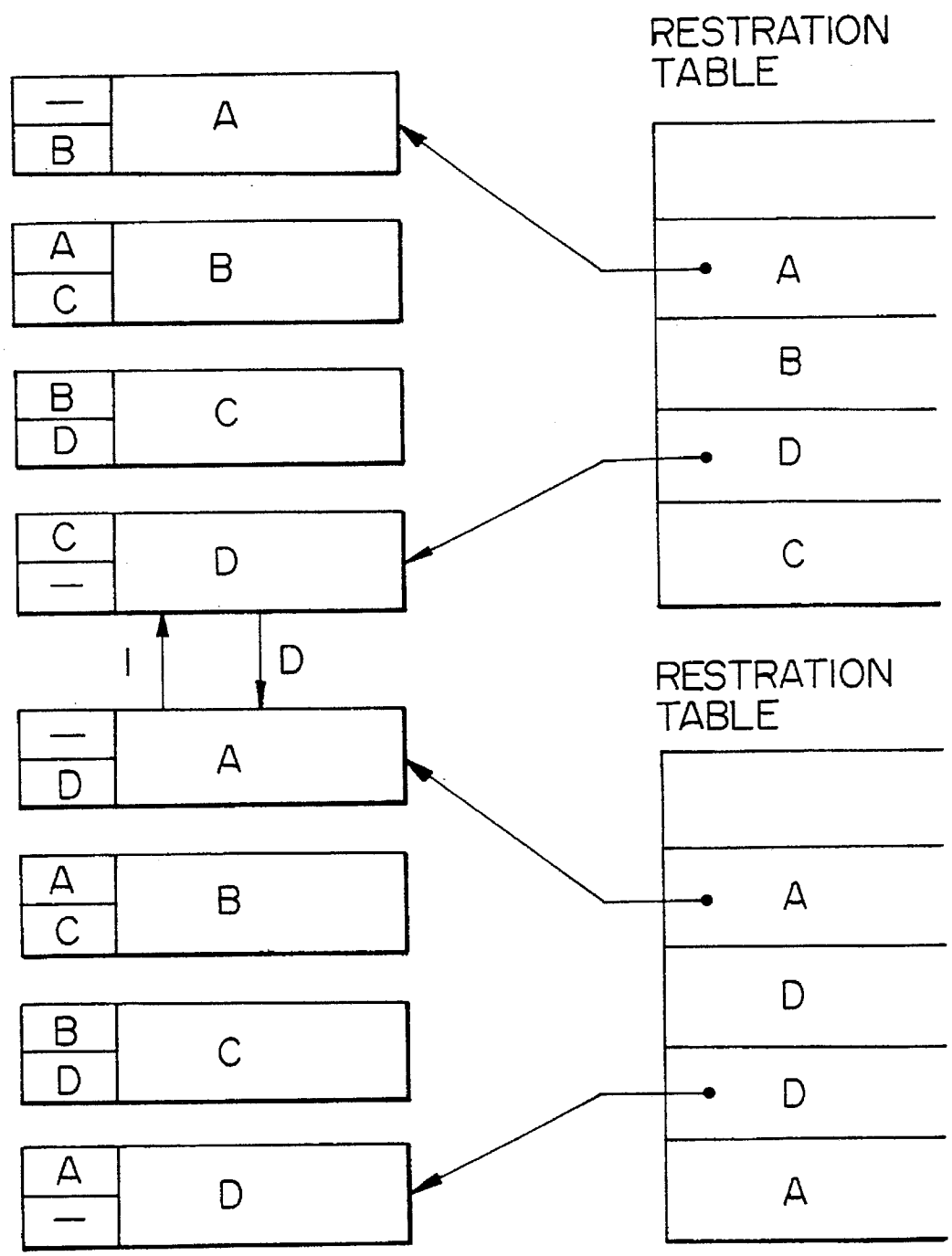
FIG. 2 is a diagram explaining the relationship between text buffers and the restoration table shown in FIG. 1.

FIG. 2 is a view explaining the relationship between text buffers and the restoration table shown in FIG. 1. In FIG. 2, A, B, C, and D are texts stored in each of the text buffers. "D" denotes a deletion and "I" denotes an insertion. This figure shows an example of a "deletion". When deleting the texts B and C, just before the text is "A" and just after the text is "D". Accordingly, the pointers A and D are applied by the text editor 43.

Figure 3:
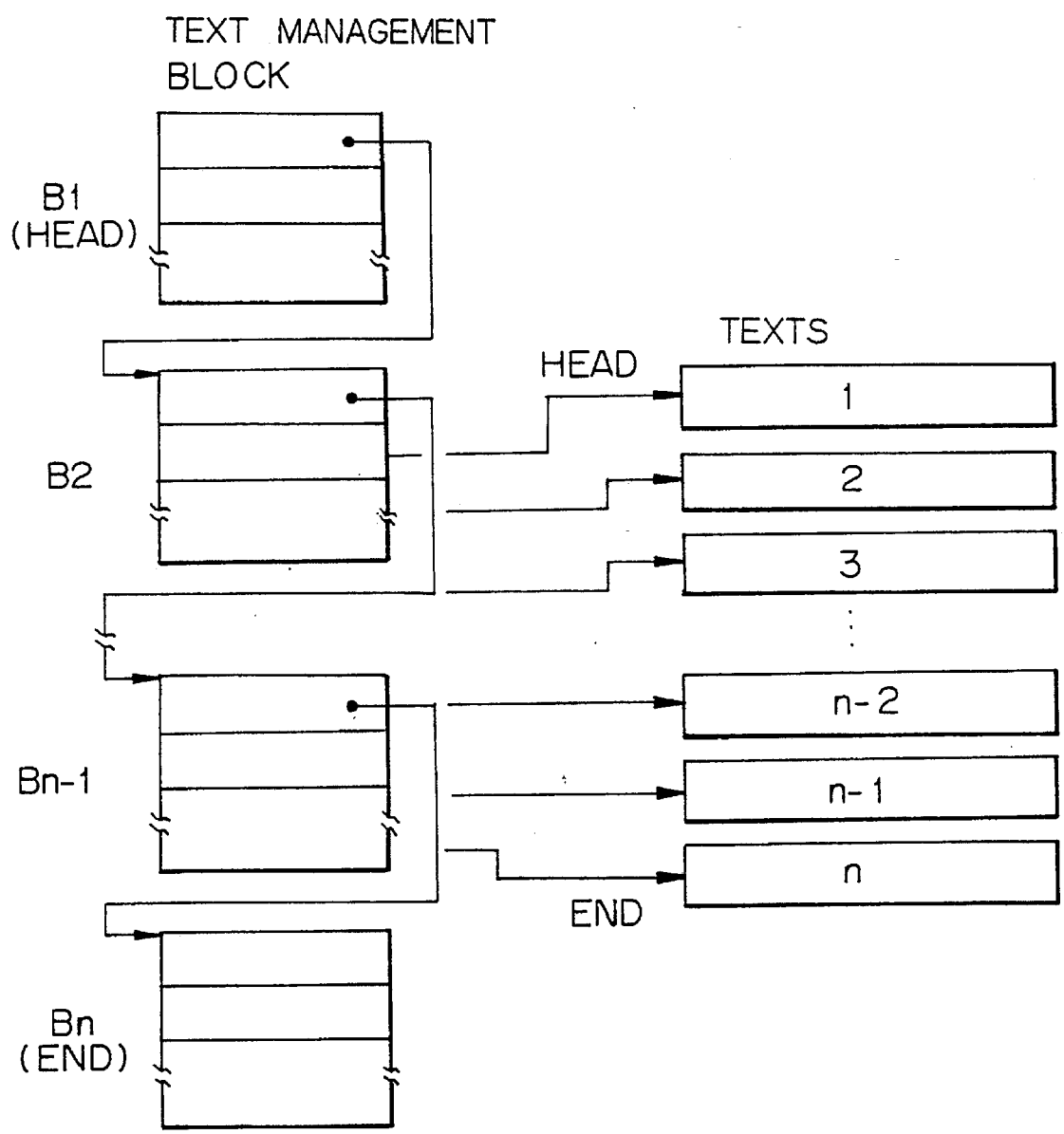
FIG. 3 is a block diagram of a conventional management of text.

FIG. 3 is a view explaining a conventional management of texts. In FIG. 3, reference numbers B1 to Bn denote text management blocks each having a plurality of text buffers. All text management blocks are sequentially connected to each other by the pointer (see, reference number 42 of FIG. 1) from the head of the text management block B1 to the end of the text management block Bn. In this case, each of the texts is pointed to by the corresponding text management block so as to be managed by every text management block.

Figure 5:
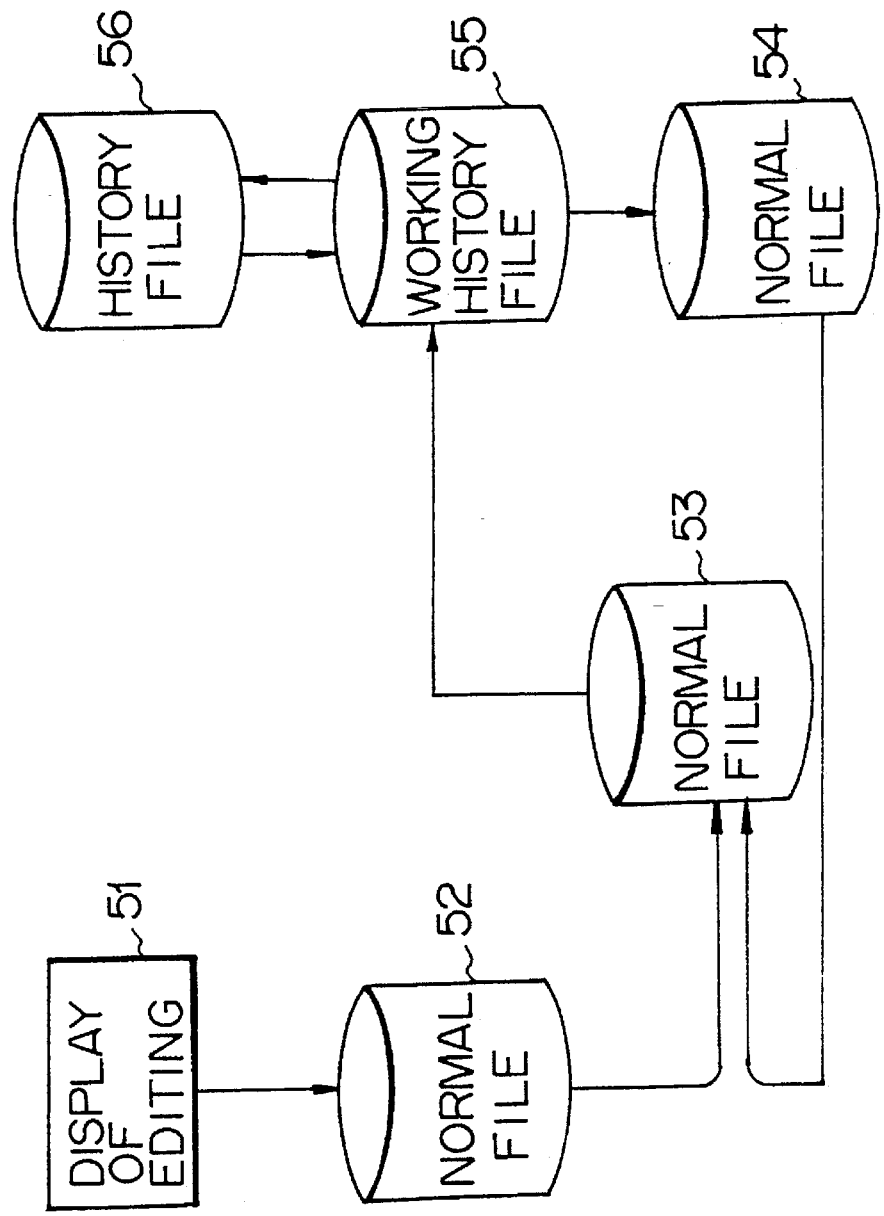
FIG. 5 is a diagram of prior art management of history in an editing operation of a text.

In the conventional method, when any one text is revised, the text management block including the text to be revised and all the texts to be pointed to by that text management block are temporarily saved in the storage means, and all texts including the revised text are held in the file system as shown in FIG. 5.

Figure 4:
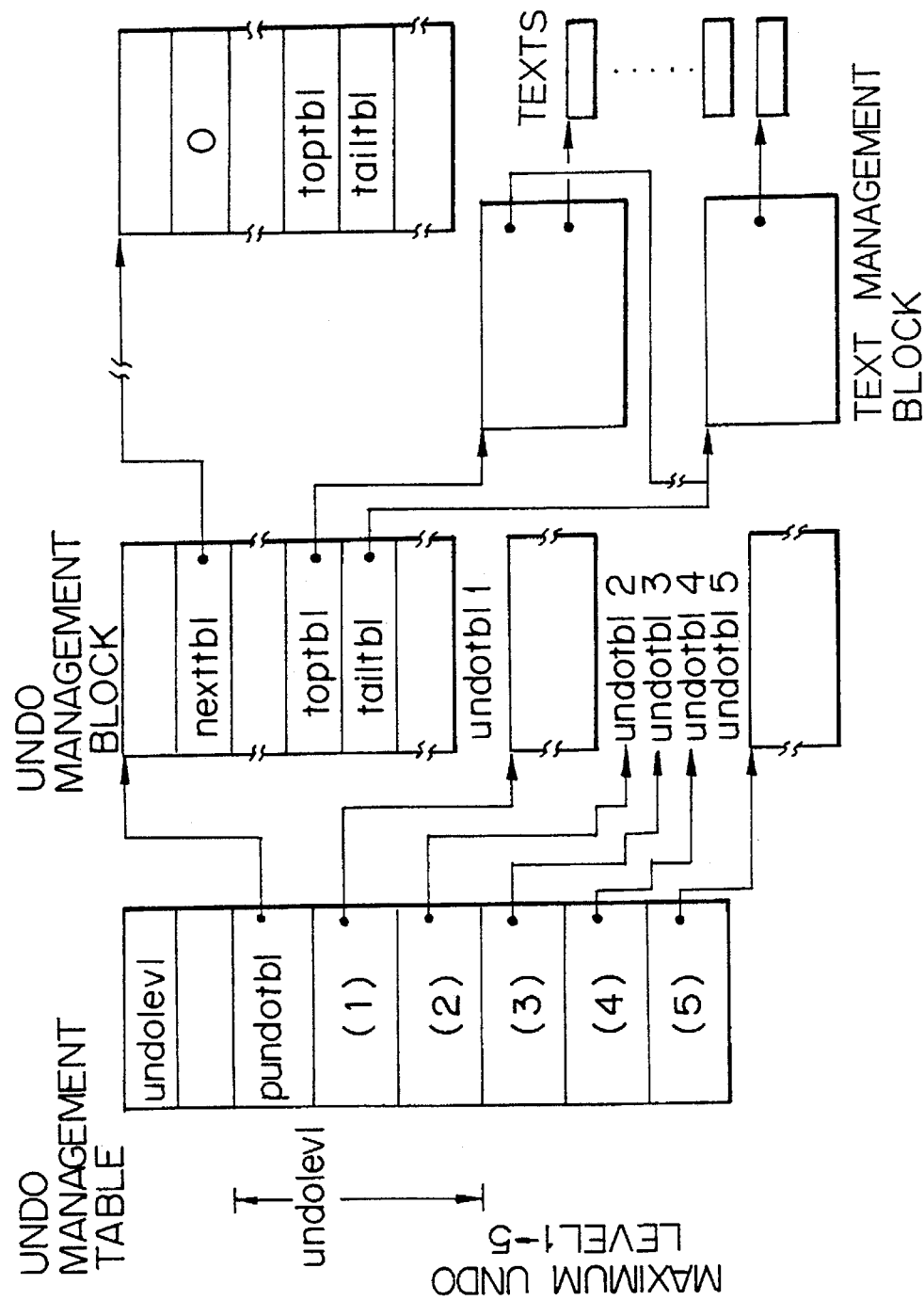
FIG. 4 is a block diagram explaining the conventional management of text shown in FIG. 3.

FIG. 4 is a view explaining a conventional art shown in FIG. 3. As shown in the drawing, there are provided an UNDO management table and an UNDO management block in addition to the text management block and the texts shown in FIG. 3 to perform an UNDO/REDO operation of the text. In general, the term "UNDO" means a restoring operation of the content of the text after canceling thereof, and the term "REDO" means a reexecuting operation of the content of the text.

In FIG. 4, the UNDO management table includes a plurality of tables indicated by undo levels shown by "undolevl", "pundotbl" and the numbers (1) to (5). In this case, the undo level shows the number of restoration, and the p-undo level shows the "previous" undo level. Accordingly, the maximum restoration level shows the maximum number possible to restore the text.

The UNDO management block includes a plurality of tables. In the table, "nexttbl" shows next table, "toptbl" shows the head of the table, and "tailtbl" shows the end of the table. As shown in the drawing, the next table points to the next UNDO management block. The table "toptbl" points to the head of the text management block 1 of FIG. 3, and the table "tailtbl" points to the end of the text management block n of FIG. 3.

These text management blocks and texts are shown in FIG. 3. The undo table 1 points to the table "undotbl 1" of the undo management block, the undo table 2 points to the table "undotbl 2" of the undo management block, and the undo table 5 points to the table "undotbl 5" of the undo management block.

FIG. 5 is a view explaining the management of history in the editing operation of the text in a conventional art. In the drawing, reference number 51 denotes a display for the editing operation, 52 to 54 denote normal files, 55 denotes a working history file, and 56 denotes a history file. The management of the history is performed without any relationship to the text management and the UNDO/REDO control. That is, a difference file indicating the difference between before/after editing is formed from the above files and the resultant data are stored in the normal file 53. Further, the content of the difference file is copied to the working file 55 and reflected in the history file 56.

The above conventional method for managing a text has the following problems. In the case of a revision for any one of the text, it is necessary to save the text management block including the text to be revised and all texts pointed to by the text management block as explained above. The above operation is the minimum required for holding the updated history. Accordingly, it is necessary to provide a large storage area for saving the history of the text in the conventional art. When a large storage area is occupied by the saving operation, the effective area to edit the text is reduced in the storage means. Further, since all texts are managed by every text management block as explained above, interfaces for managing the texts become complex so that the performance of the system deteriorates.

In other words, it is necessary to provide four structural elements, i.e., the text management block, the text, the UNDO management table, and the UNDO management block in the UNDO/REDO control for restoring or reexecuting the text in the editing operation. Accordingly, since it is necessary to provide the above four structural elements to revise only one of the text, the saving operation becomes complex and such an operation results in the deterioration of performance.

FIG. 6 is a schematic block diagram of a text managing system according to an embodiment of the present invention. In the present invention, there are provided a text operation unit 1, an UNDO/REDO control unit 2, an UNDO management table 3, an UNDO management block 4, an UNDO text 5, a text processing unit 6, a text management block 7, an insertion text 8, an update text 9, a deletion text 10, and a history management unit 11.

As shown in the drawing, one of the structural features of the present invention lies in the provision of the text operation unit 1. Only one of the text operation means 1 is provided in the system for the editing operation when inserting, updating, or deleting the texts. The other structural feature lies in the provision of three kinds of texts for the insertion, the update, and the deletion operation. Further, three kinds of flags are provided for performing the insertion, the update, and the deletion operation. According to the present invention, it is possible to effectively perform text management, UNDO/REDO control, and history management.

The operation of each of the structural elements will be explained in detail hereinafter.

The text operation means 1 is provided for receiving the instructions of the insertion, the update, and the deletion of the text from the operator, and for displaying the result of the editing for the text on the screen.

The UNDO/REDO control unit 2 is operatively connected to the text operation means 1. The UNDO/REDO control unit 2 restores the text to be displayed on the screen for the previous states (for example, the state of the last time, and the state before the last time of the text), and reexecutes (i.e., performs REDO control) from the restored state. Further, the UNDO/REDO control unit 2 is operatively connected to the UNDO management table 3, the UNDO management block 4, and the UNDO text 5.

The UNDO management table 3 manages the texts by pointing to a plurality of UNDO management blocks 4.

The UNDO management block 4 manages the texts previously edited by pointing to the UNDO text 5 corresponding to the insertion text 8, the update text 9, and the deletion text 10.

The UNDO text 5 holds the insertion text 8, the update text 9, and the deletion text 10, which are inserted, updated, and deleted in the editing operation.

The text processing unit 6 manages the text already edited. The text management block 7 manages a plurality of texts for every block. The insertion text 8, the update text 9, and the deletion text 10 correspond to the texts inserted, updated and deleted in the editing operation. The history management unit 11 forms the difference text for the before/after editing operations based on the text management block 7, the insertion text 8, the update text 9, and the deletion text 10.

The following figures are provided to explain insertion, update and deletion texts, and operation thereof according to the present invention.

Figure 7A:
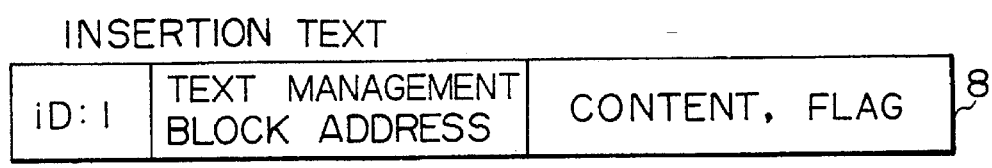
FIG. 7A is a first example of an insertion text shown in FIG. 6.
Figure 7B:
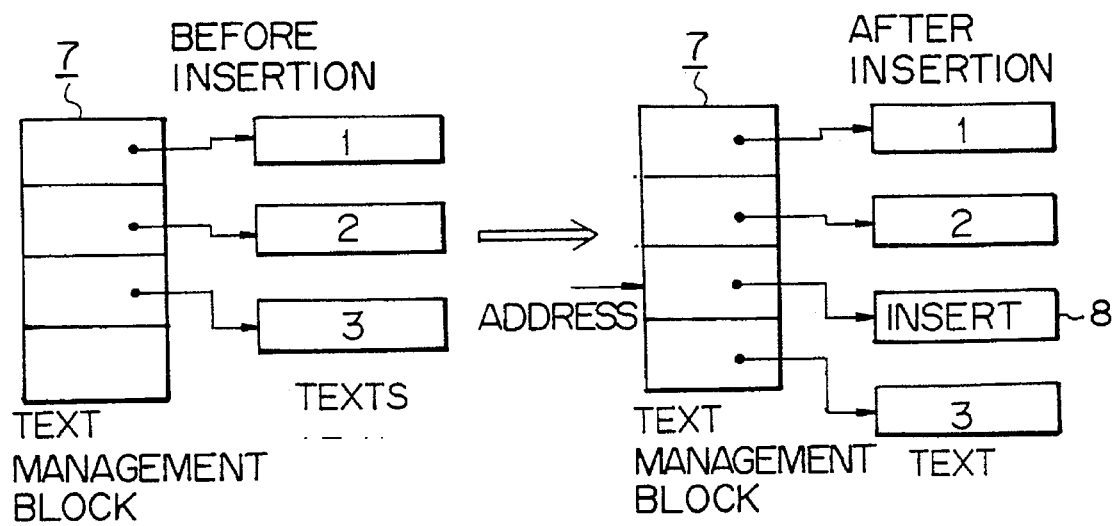
FIG. 7B is a diagram of an insertion operation shown in FIG. 6.

FIG. 7A shows one example of an insertion text, and FIG. 7B is a view explaining an insertion operation. The operator watches the texts displayed on the screen, and decides a predetermined text to be inserted between the displayed texts. At this time, the insertion text 8 to be inserted between the texts is generated from the text processing means 6 shown in FIG. 6.

In FIG. 7A, the insertion text 8 is formed by three areas, i.e., an identification area, an address area, and a content area. The identification area is shown by "id:I", and "I" denotes the insertion. The address area stores an entry address of the text management block. The entry address points to the address of the text to be inserted. The content area stores the content of the entry and an insertion flag.

In FIG. 7B, the left side denotes the state before the insertion operation, and the right side denotes the state after the insertion operation. In the state before the insertion operation, each of the text management blocks 7 manages corresponding texts 1 to 3. In the state after insertion operation, the text management block points to the address of the text to be inserted and generates the insertion text 8. Finally, the insertion text 8 is inserted between the text 2 and the text 3.

Figure 8A:
FIG. 8A is a diagram of an update text shown in FIG. 6.
Figure 8B:
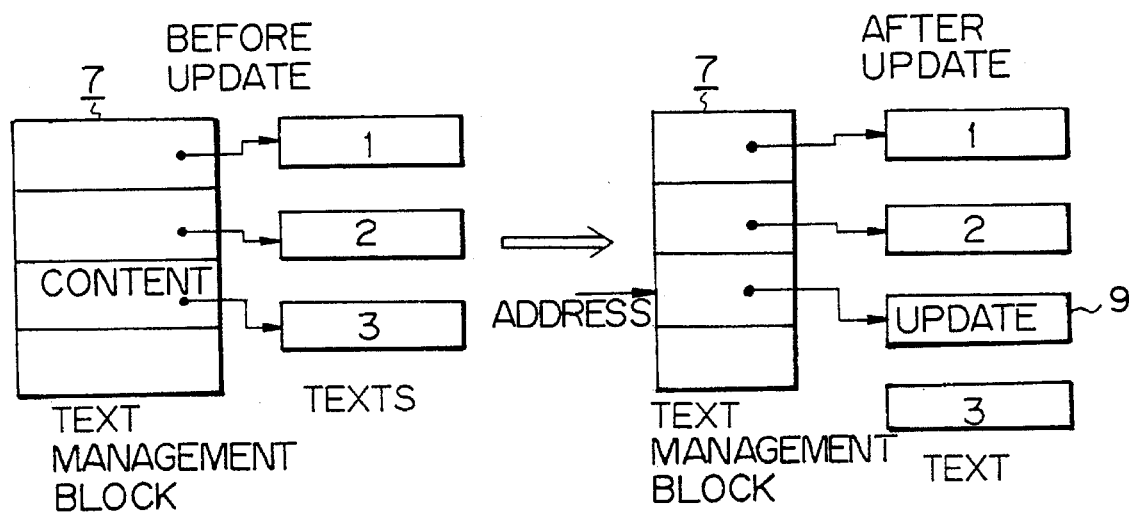
FIG. 8B is a diagram of an update operation shown in FIG. 6.

FIG. 8A shows one example of an update text, and FIG. 8B is a view for explaining an update operation. The operator monitors the texts displayed on the screen, and decides on one of texts to be updated. At this time, the update text 9 to be updated is generated from the text processing means 6 shown in FIG. 6.

In FIG. 8A, the update text 9 is formed by three areas, i.e., an identification area, an address area, and a content area. The identification area is shown by "id:U", and "U" denotes the update. The address area stores an entry address of the text management block. The entry address points to the address of the text to be updated. The content area stores the content of the entry and an update flag.

In FIG. 8B, the left side denotes the state before the update operation, and the right side denotes the state after the update operation. In the state before the update operation, each of the text management blocks 7 manages corresponding row texts 1 to 3. "content" denotes the content to be updated.. In this case, the content of the text 3 is updated. In the state after the insertion operation, the text management block points to the address of the text to be updated and generates the update text 9. Finally, the content of the text 3 is updated by the update text 9.

Figure 9A:
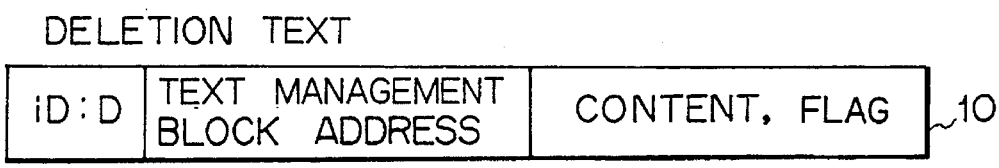
FIG. 9A is a diagram of a deletion text shown in FIG. 6.
Figure 9B:
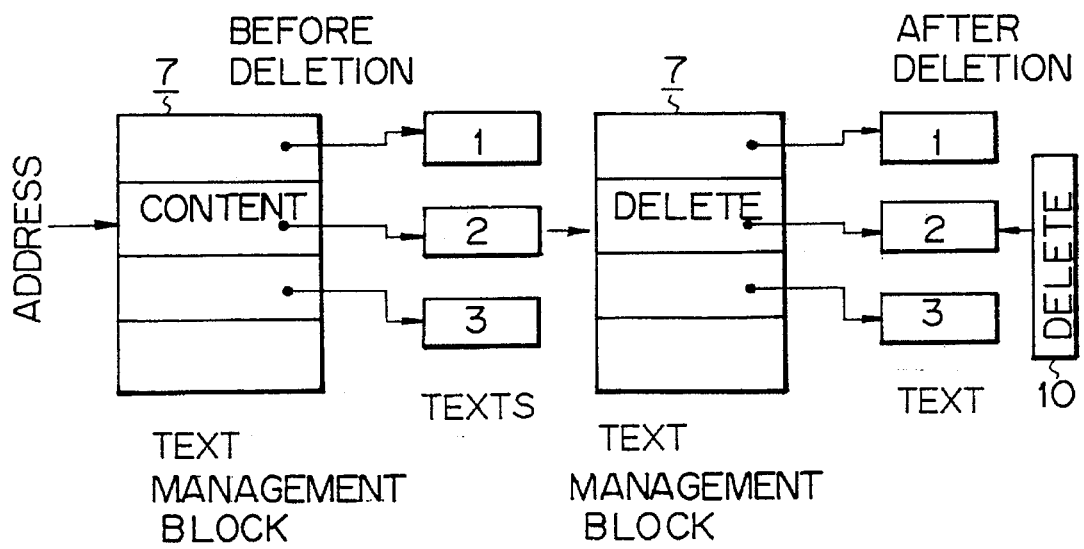
FIG. 9B is a diagram of a deletion operation shown in FIG. 6.

FIG. 9A shows one example of a deletion text, and FIG. 9B is a view explaining a deletion operation. The operator watches the texts displayed on the screen, and decides on one of the texts to be deleted. At this time, the deletion text 9 to be deleted is generated from the text processing means 6 shown in FIG. 6.

In FIG. 9A, the deletion text 10 is formed by three areas, i.e., an identification area, an address area, and a content area. The identification area is shown by "id:D", and "D" denotes the deletion. The address area stores an entry address of the text management block. The entry address points to the address of the text to be deleted. The content area stores the content of the entry and a deletion flag.

In FIG. 9B, the left side denotes the state before the deletion operation, and the right side denotes the state after the deletion operation. In the state before deletion operation, each of the text management blocks 7 manages corresponding row texts 1 to 3. "Content" denotes the content to be deleted. In this case, the content of the text 2 is deleted. In the state after the deletion operation, the text management block points to the address of the text to be deleted and generates the deletion text 10. Finally, the content of the text 2 is deleted by the deletion text 10.

Figure 10:
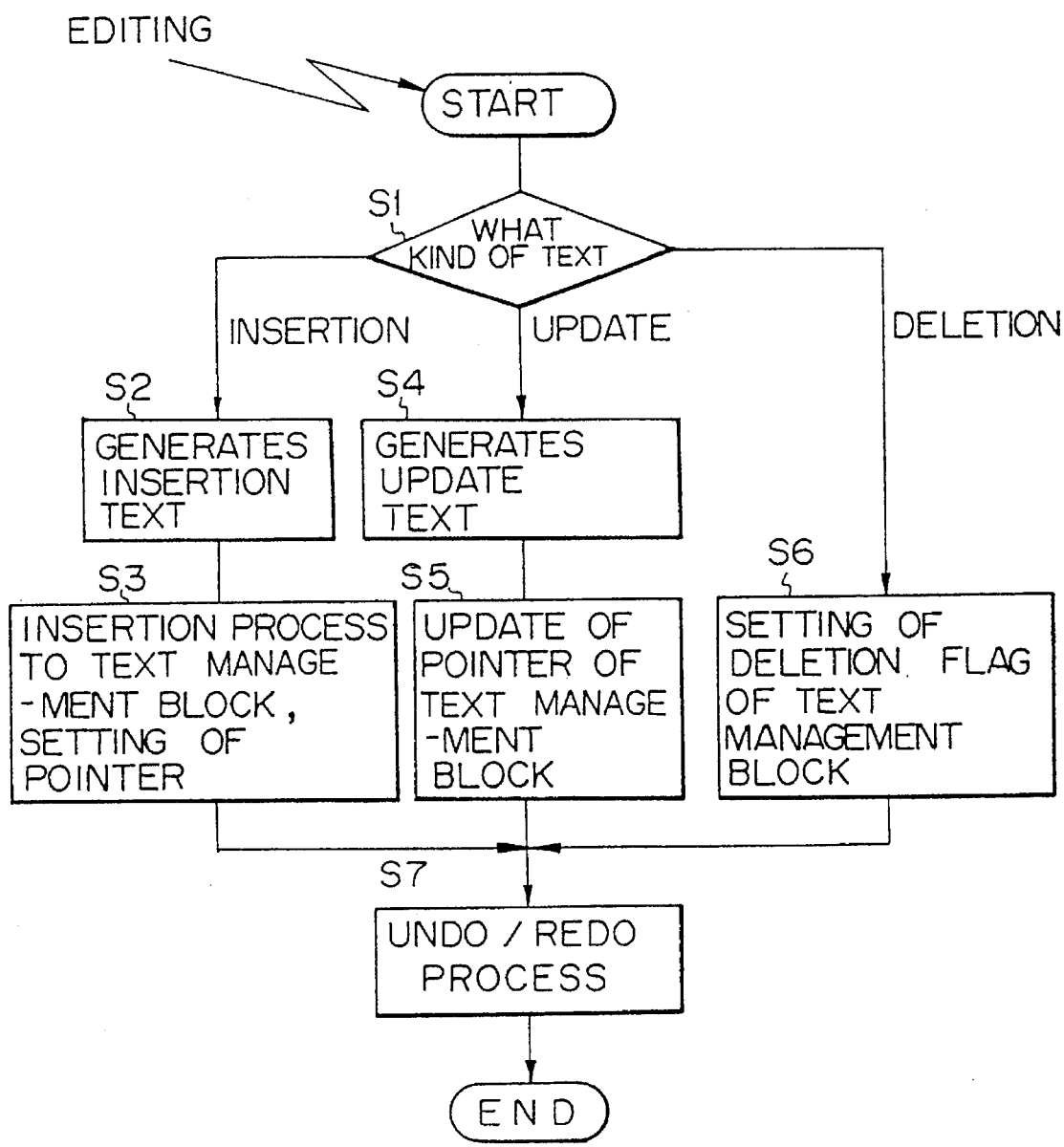
FIG. 10 is a basic flowchart explaining the operation of the text managing system shown in FIG. 6.

FIG. 10 is a basic flowchart explaining the operation of the text managing system.

In step S1, the operator selects any one of the texts, i.e., the insertion text, the update text and the deletion text.

In step S2, when the operator wants to insert the text, the insertion text 8 is generated.

In step S3, the insertion process is performed in the text management block 7, and the text management block 7 points to the address of the text to be inserted. As shown in FIG. 6, when the entry of the text management block 7 is determined, the address of the insertion text 8 is set and the insertion text 8 is generated from the text processing means 6.

In step S4, when the operator wants to update the text, the update text 9 is generated.

In step S5, the pointer of the text management block is updated. As shown in FIG. 8B, when the update text 9 is generated, and the content of the entry of the corresponding text is updated based on the address of the update text 8.

In step S6, when the operator wants to delete the text, the deletion flag of the text management block is set. As shown in FIG. 9B, when the deletion flag is set to the corresponding entry of the text management text 7, the deletion text 10 is generated and the corresponding text is deleted.

In step S7, the UNDO/REDO process is performed. As explained in FIG. 11, in the UNDO process, the text indicating the state just before editing can be restored and displayed on the screen. In the REDO process, the text indicating the state just after editing can be generated and displayed on the screen.

Figure 11:
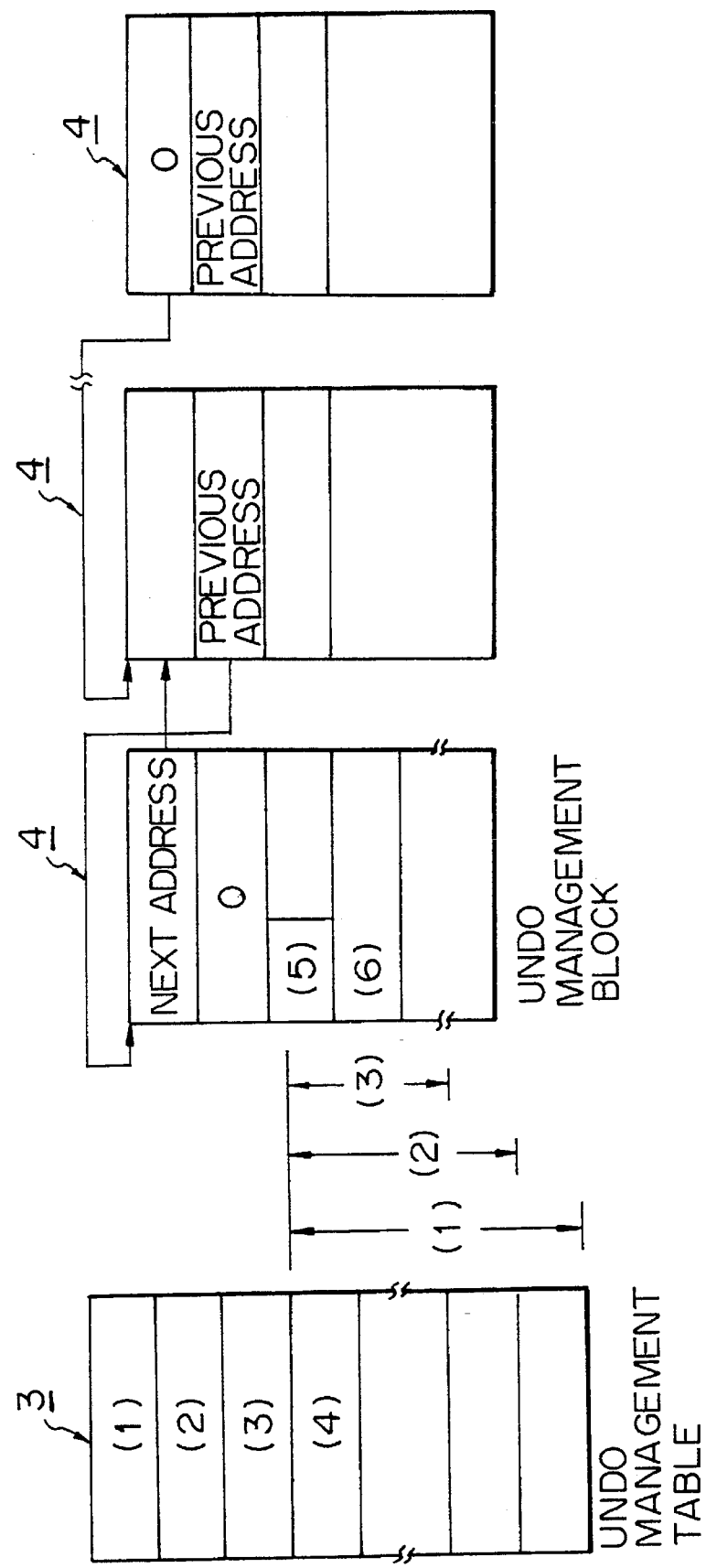
FIG. 11 is a diagram of an UNDO/REDO control operation according to the present invention.

FIG. 11 is a view explaining an UNDO/REDO control operation according to the present invention. In FIG. 11, reference number 3 denotes an UNDO management table, and reference number 4 denotes an UNDO management block. The UNDO management table 3 is provided for managing the UNDO management block 4 and has the following contents. That is, the entry (1) denotes a maximum UNDO level, (2) denotes an UNDO level now retained, (3) denotes a current UNDO level, and (4) denotes a head address of the UNDO management block. In the UNDO management block, (5) denotes an effective entry number of the UNDO management block, and (6) denotes an UNDO text (insertion, update, and deletion).

The maximum UNDO level (1) indicates the maximum number of times possible to perform the UNDO operation. In this case, when the number of times is zero, the UNDO process is not performed. The UNDO level (2) indicates the level of the UNDO held at the present stage. The entry (4) shows the head address of the UNDO text management block at the predetermined level. The area (5) shows the effective entry number at the UNDO text management block. The entry (6) shows the address of the UNDO text, i.e., the insertion text, the update text, and the deletion text.

In the UNDO management block 4, the address of the UNDO text (insertion, update and deletion) is set into the entry (6). The UNDO management block 4 manages the unit to be processed at once times of UNDO operation. In this case, the addresses of the UNDO text (insertion, update, and deletion) is shown by the head address of the insertion text, the update text, and the deletion text forming the UNDO text 5, and held to perform the UNDO/REDO operation. The operation of the UNDO management block 4 is explained in FIG. 12.

Figure 12:
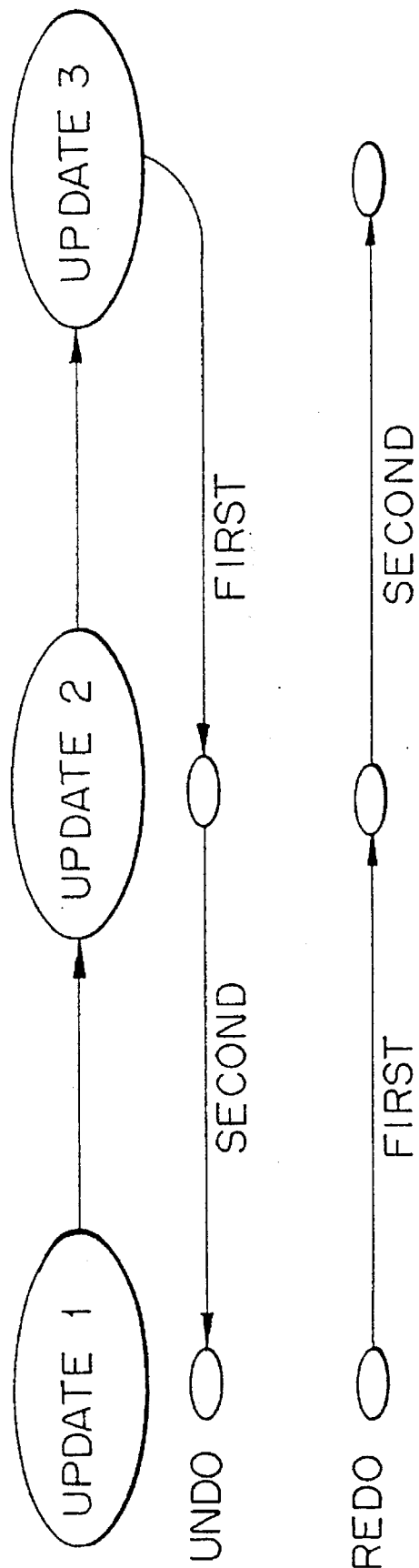
FIG. 12 is a diagram of an UNDO/REDO operation according to the present invention.

FIG. 12 is a view explaining an UNDO/REDO operation. In the drawing, the steps (update 1→update 2→update 3) denote the order of the update operation of the text. In the UNDO operation, the state of the update 3 is restored to the state of the update 2 in the first step, and the state of the update 2 is restored to the state of the update 1 in the second step in the UNDO operation performed by the operator. In the REDO operation, the state of the update 1 is reexecuted in the first step so that the state of the update 2 is obtained. Further, the state of the update 2 is reexecuted in the second step so that the state of the update 3 is obtained.

In the UNDO operation, the previous UNDO management block 4 is found therefrom, and the insertion text, the update text or the deletion text is selected from the UNDO text 5 shown in FIG. 6 based on the address of the UNDO text (insertion, update, and deletion) stored in the entry (6). Accordingly, previous states can be sequentially restored and displayed on the screen. These steps are repeated in the restoration (UNDO) process.

In the REDO operation, the next UNDO management block 4 is found therefrom, and the insertion text, the update text or the deletion text is selected from the UNDO text 5 shown in FIG. 6 based on the address of the UNDO text (insertion, update, and deletion) stored in the entry (6). Accordingly, preceeding states (for example, the state of the next time, and the state after the next time) can be sequen-tially reexecuted and displayed on the screen. These steps are repeated in the rerunning (REDO) process.

Figure 13:
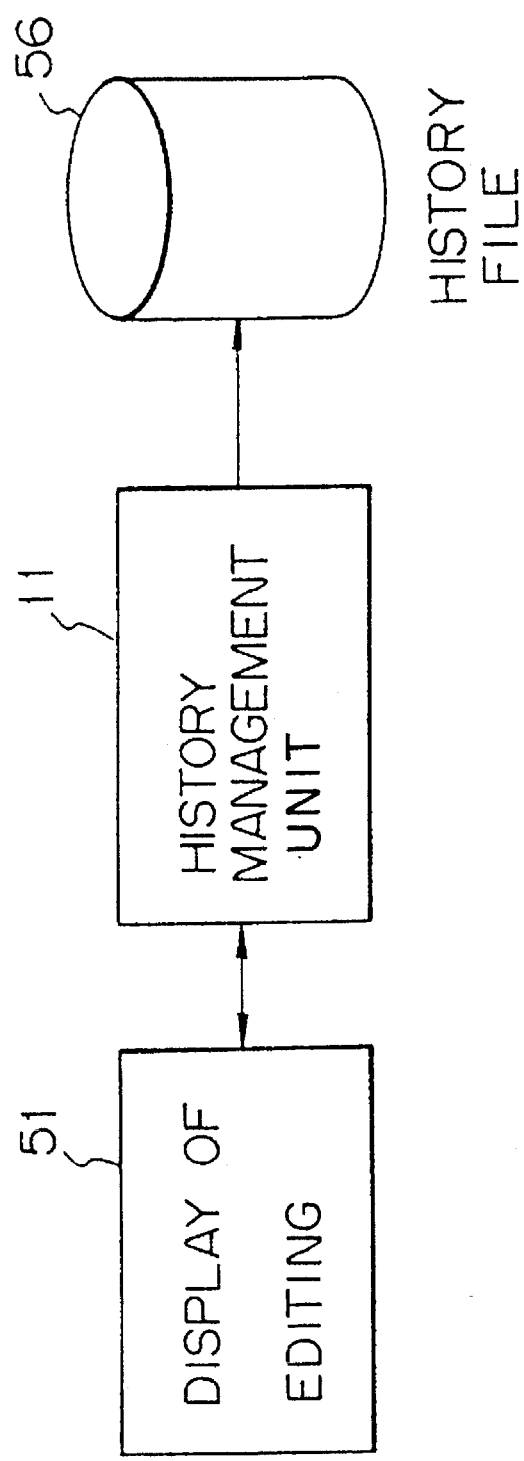
FIG. 13 is a diagram of the management of history for an editing operation of the text according to the present invention.

FIG. 13 is a view explaining the management of history for the editing operation of the text according to the present invention. As is obvious from the drawing, only three structural elements, i.e., the display for the editing 51, the history management unit 11, and the history file 56, are necessary for management of the history of the text. This structure is very simple compared to that of the conventional art shown in FIG. 5. In this case, as shown in FIG. 6, the history management means 11 forms the difference text or net change text for the before/after editing operation based on the text management block 7, the insertion text 8, and the update text 9, and the deletion text 10.

Accordingly, in the present invention, it is not necessary to provide a difference file between the before editing and the after editing in the conventional art so that it is possible to simplify the structure as shown in FIG. 13.

I claim:

1. A text managing system for performing an editing operation of a text, by using a text editing program in a computer system, said text managing system comprising:

text operation means for receiving at least one of insertion, update and deletion information for the text, as instructed by an operator, and for displaying the result of editing the text on a screen;

UNDO/REDO control means, operatively connected to said text operation means, for restoring the text to be displayed on said screen to a most recent previous state, said previous state existing prior to a result of the editing, and for reexecuting the text restored as a result of said restoring;

text processing means, operatively connected to said UNDO/REDO control means, for managing the text already edited during the editing operation in response to said UNDO/REDO control means;

a text management block, for managing current text, comprising a plurality of entries of pointers to a plurality of UNDO texts;

each of said plurality of UNDO texts comprising an ID field, an ADDRESS field and a CONTENT field, said ID field storing a type of the UNDO text, said ADDRESS field storing a pointer to one of said plurality of entries of said text management block and said CONTENT field storing a character-string data being edited;

an UNDO management table, operatively connected to said UNDO/REDO control means, for storing in correspondence with each editing operation which is performed, a corresponding UNDO level indicating the number of the UNDO operation; and a plurality of UNDO management blocks, each storing a plurality of pointers and each pointer pointing to one of said plurality of UNDO texts.

2. A text managing system as claimed in claim 1, further comprising history management means for forming a difference text for before/after editing operations based on the insertion text, the update text and the deletion text from said text management block.

3. A text managing system as claimed in claim 1, wherein said type of the UNDO text comprises one of an insertion text, an update text and a deletion text.

* * * * *

UNITED STATES PATENT AND TRADEMARK OFFICE
CERTIFICATE OF CORRECTION

PATENT NO. : 5,604,853
DATED : Feb. 18, 1997
INVENTOR(S) : NAGASHIMA

It is certified that error appears in the above-indentified patent and that said Letters Patent is hereby corrected as shown below:

TITLE PAGE: Item

[30] Foreign Application Priority Data, change "03113578" to --03-113578--;

[57] ABSTRACT, line 14, change "into" to --to--; line 16, change "to" to --into--; and line 17, delete "for".

Col. 2, line 26, after "prior art" insert --computer--.

Signed and Sealed this

Twenty-second Day of July, 1997

Attest:

BRUCE LEHMAN

*Attesting Officer*     *Commissioner of Patents and Trademarks*